US011516180B2

(12) United States Patent
Rocquelay et al.

(10) Patent No.: US 11,516,180 B2
(45) Date of Patent: Nov. 29, 2022

(54) METHOD AND DEVICE FOR INSTALLING A NODE IN A HOME NETWORK

(71) Applicant: SAGEMCOM BROADBAND SAS, Rueil Malmaison (FR)

(72) Inventors: Antonie Rocquelay, Rueil Malmaison (FR); Loig Atzel, Rueil Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 193 days.

(21) Appl. No.: 15/931,635

(22) Filed: May 14, 2020

(65) Prior Publication Data

US 2020/0382469 A1  Dec. 3, 2020

(30) Foreign Application Priority Data

May 28, 2019 (FR) ...................................... 1905680

(51) Int. Cl.
*H04L 9/40* (2022.01)
*H04L 41/0806* (2022.01)
(Continued)

(52) U.S. Cl.
CPC ...... *H04L 63/0209* (2013.01); *H04L 41/0809* (2013.01); *H04L 41/12* (2013.01);
(Continued)

(58) Field of Classification Search
None
See application file for complete search history.

(56) References Cited

U.S. PATENT DOCUMENTS 11,140,727 B2 * 10/2021 Ha ........................ H04W 12/50
2013/0107796 A1 * 5/2013 Du ........................ H04W 88/04
370/315
(Continued)

FOREIGN PATENT DOCUMENTS

EP 2 713 671 A2 4/2014
TW I648999 B 1/2019

OTHER PUBLICATIONS

Netgear et al. "Universal WiFi Range Extender WN2000RPT User Manual" pp. 1-31, Dec. 2010.
(Continued)

*Primary Examiner* — Brian S Roberts
(74) *Attorney, Agent, or Firm* — Oliff PLC

(57) ABSTRACT

A method is provided for installing a new node in a wireless home network having a client network and includes a node able to form a mesh network. A connection of a new node to the client network supplied by the home network node is detected, and an identifier of a client device that is connected to the client network is received. If the client device is known to the home network: the new node is notified that the client device that is connected to the client network must be disconnected from the client network; a connection of the client device to the client network supplied by the node of the home network is detected; and identifiers of the mesh network are transferred to the new node if the connection of the disconnected client device to the client network supplied by the node of the domestic network is detected.

12 Claims, 7 Drawing Sheets

(51) Int. Cl.
  *H04L 41/12* (2022.01)
  *H04W 12/08* (2021.01)
  *H04W 52/38* (2009.01)
  *H04W 84/22* (2009.01)
  *H04W 88/08* (2009.01)
  *H04W 88/16* (2009.01)

(52) U.S. Cl.
  CPC .......... *H04L 63/166* (2013.01); *H04W 12/08* (2013.01); *H04W 52/38* (2013.01); *H04W 84/22* (2013.01); *H04W 88/08* (2013.01); *H04W 88/16* (2013.01)

(56) References Cited

U.S. PATENT DOCUMENTS

| | | | |
|---|---|---|---|
| 2014/0376405 A1* | 12/2014 | Erickson | H04L 61/00 370/254 |
| 2015/0043377 A1* | 2/2015 | Cholas | H04W 48/08 370/254 |
| 2019/0208413 A1 | 7/2019 | Chiou et al. | |

OTHER PUBLICATIONS

Netgear et al. "User Manual AC1750 WiFi Mesh Extender Model EX6250" pp. 1-64, Jan. 2019.

Feb. 24, 2020 French Search Report issued in French Patent Application No. 1905680.

\* cited by examiner

METHOD AND DEVICE FOR INSTALLING A NODE IN A HOME NETWORK

TECHNICAL FIELD

The present invention relates to a method and a device for installing a node in a home network.

PRIOR ART

In a home network, such as for example a network of the Wi-Fi type, connected to the internet via a residential gateway, it is sometimes necessary to extend the coverage of the home network of the residential gateway. Devices such as TV set-top boxes or network extenders make it possible to achieve this extension of the network coverage supplied by the residential gateway. These devices are connected together by means of a mesh Wi-Fi network.

Installing a new node sometimes requires the action on site of a technician. This solution, because of the delay and the cost of work of the technician of the operator, is not optimal.

Another possibility could be adding new operating modes of the Wi-Fi home network such as the "infrastructure" mode or the "ad hoc" mode or the "direct Wi-Fi" mode, or the addition of a new name of a dedicated wireless network (service set identifier). These additions are not necessary to the nominal functioning after the installation of a new node.

Another possibility could be adding new wireless networks such as Bluetooth/Rfid/Nfc. These additions are not necessary to the nominal functioning after the installation of a new node.

DISCLOSURE OF THE INVENTION

The aim of the present invention is to solve the drawbacks of the prior art by proposing an installation method and device that make it possible to achieve an installation of a new node in a mesh network using only the elements present in the home network, without the action of a technician, which is simple and secure while avoiding the addition of new operating modes or new wireless networks that are not useful in the conventional use of the home network.

To this end, according to a first aspect, the invention proposes a method for installing a new node in a wireless home network, the home network consisting of a client network by means of which client devices access an external network by means of a residential gateway, the home network comprising a node able to form a mesh network within the home network in order to extend the range of the home network and supplying the client network, characterised in that the method comprises the steps, performed by the node of the home network, of:
  detecting a new connection of a new node to the client server supplied by the node of the home network,
  receiving an identifier of a client device that is connected to the client network supplied by the new node itself connected to the client network of the node of the home network,
  checking whether the client device is a client device known to the home network and, if so:
  notifying the new node that the client device that is connected to the client network supplied by the new node must be disconnected from the client network,
  detecting a connection of the client device to the client network supplied by the node of the home network,
  transferring to the new node identifiers of the intermediate network according to a security protocol of the transport layer if the connection of the client device to the client network supplied by the node of the home network is detected.

The invention also relates to a device for installing a new node in a wireless home network, the home network consisting of a client network by means of which the client devices access an external network by means of a residential gateway, the home network comprising a node able to form a mesh intermediate network within the home network in order to extend the range of the home network and supplying the client network, characterised in that the device is included in the node of the home network, and comprises:
  means for detecting a new connection of a new node to the client server supplied by the node of the home network,
  means for receiving an identifier of a client device that is connected to the client network supplied by the new node itself connected to the client network of the node of the home network
  means for checking whether the client device is a client device known to the home network and, if so:
  means for notifying the new node that the client device that is connected to the client network supplied by the new node must be disconnected from the client network,
  means for detecting a connection of the client device to the client network supplied by the node of the home network,
  means for transferring to the new node identifiers of the intermediate network according to a security protocol of the transport layer if the connection of the client device to the client network supplied by the node of the home network is detected.

The invention also relates to a method for installing a new node in a wireless home network, the home network consisting of a client network by means of which client devices access an external network by means of a residential gateway, the home network comprising a node able to form a mesh network within the home network in order to extend the range of the home network, characterised in that the method comprises the steps, performed by the new node, of:
  connecting the new node to be installed to the client network supplied by the home network,
  connecting, according to a security protocol, the transport layer to the node able to form a mesh network,
  detecting a new connection coming from a client device to the client network supplied by the new node,
  recovering an identifier of the client device and transferring the identifier to the node able to form the mesh network,
  receiving a notification requesting disconnection of the client device from the client network supplied by the new node,
  disconnecting the client device from the client network supplied by the new node,
  receiving, from the node able to form a mesh network, identifiers enabling the new node to connect to the mesh network,
  configuring the identifiers making it possible to finalise the method for installation of the new node.

The invention also relates to a device for installing a new node in a wireless home network, the home network consisting of a client network by means of which client devices access an external network by means of a residential gateway, the home network comprising a node able to form a mesh network within the home network in order to extend the range of the home network, characterised in that the installation device comprises a new node and comprises:

means for connecting the new node to be installed to the client network supplied by the home network, means for connecting, according to a security protocol, the transport layer to the node able to form a mesh network, means for detecting a new connection coming from a client device to the client network supplied by the new node, means for recovering an identifier of the client device and transferring the identifier to the node able to form the mesh network, means for receiving a notification requesting disconnection of the client device from the client network supplied by the new node, means for disconnecting the client device from the client network supplied by the new node, means for receiving, from the node able to form a mesh network, identifiers enabling the new node to connect to the mesh network, means for configuring the identifiers making it possible to finalise the method for installation of the new node.

Thus, by requesting the individual who installs the new node to connect his client device to the new node and then to the network node, it is possible to identify the person who installs the new node. If the client device is not known to the network, it is possible to prevent a malevolent third party extending the range of the home network without the users of the home network being informed thereof.

The client device of the individual is considered to be a trusted third party.

By requesting the individual who installs the new node to connect the latter to the client network supplied by the home network, the node of the home network discovers the presence of a new node, but it does not know whether it belongs to the home network or to a malevolent third party. By always asking the same individual to connect his client device wishing to adopt the role of trusted third party to the client network supplied by the new node to be installed, the new node sends an identifier of the client device to the node of the home network that validates the fact that the identifier of the client device is indeed a regular user of the home network without knowing whether the identifier of the client device has not been usurped by a malevolent third party. By disconnecting the client device from the client network supplied by the new node to be installed, it automatically reconnects to the client network supplied by the home network and enables the node of the home network to validate the identity of the client device endorsing the role of trusted third party and through the trust validates that the new node is not a malevolent third party attempting to extend the range of the home network without the users of the home network being informed thereof.

According to a particular embodiment of the invention, the transfer to the new node of the identifiers of the mesh network according to a security protocol of the transport layer is performed if the client device is disconnected at least twice from the client network supplied by the new node and if the client device connects to the client network supplied by the node of the home network at each disconnection of the client device supplied by the new node.

Thus, by increasing the number of connections and disconnections and optionally by changing the reconnection node of the home network, it is possible to increase the level of authentication of the client device adopting the rule of trusted third party and through the trust to authenticate the new node in order to prevent a malevolent third party extending the range of the home network without the users of the home network being informed thereof.

According to a particular embodiment of the invention, the method further comprises a step of transferring a command to reduce the transmission power of the signals transmitted by the new node.

Thus, by reducing the transmission power of the signals, the person installing the new node is obliged to place the new node close to the node of the network. It is possible to prevent a malevolent third party extending the range of the home network without the users of the home network being informed thereof.

According to a particular embodiment of the invention, the method further comprises a step of reducing the transmission power of the signals transmitted by the node of the home network if no drop in the transmission power of the signals transmitted by the new node is detected.

Thus, by reducing the transmission power of the signals, the person installing the new node is obliged to place the new node close to the node of the network. It is possible to prevent a malevolent third party extending the range of the home network without the users of the home network being informed thereof.

According to a particular embodiment of the invention, the method further comprises the step, performed prior to the notification to the new node that the client device that is connected to the client network supplied by the new node must be disconnected from the client network, of transferring a message to other nodes in the network notifying the other nodes that the client device must not be taken over by the other nodes.

According to a particular embodiment of the invention, the method further comprises the step, performed subsequently to the transfer to the new node of the identifiers of the network, of transferring a message to other nodes in the network notifying the other nodes that the client device can be taken over by the other nodes.

Thus the home network reactivates the roaming function for this client device in order to return to a normal operating state.

According to a particular embodiment of the invention, the taking over or non-taking over of the client device is performed using whitelists or blacklists.

Thus the node of the home network can easily force the disconnection and reconnection of the client device to the client network supplied by a node of the mesh network or to the client network supplied by the new node.

According to a particular embodiment of the invention, the method further comprises a step of notifying the other nodes of the taking over by the node of the network of the installation of the new node.

The invention also relates to the computer programs stored on an information carrier, said programs comprising instructions for implementing the methods described above, when they are loaded into and executed by a computer system.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DISCLOSURE OF EMBODIMENTS

Figure 1:
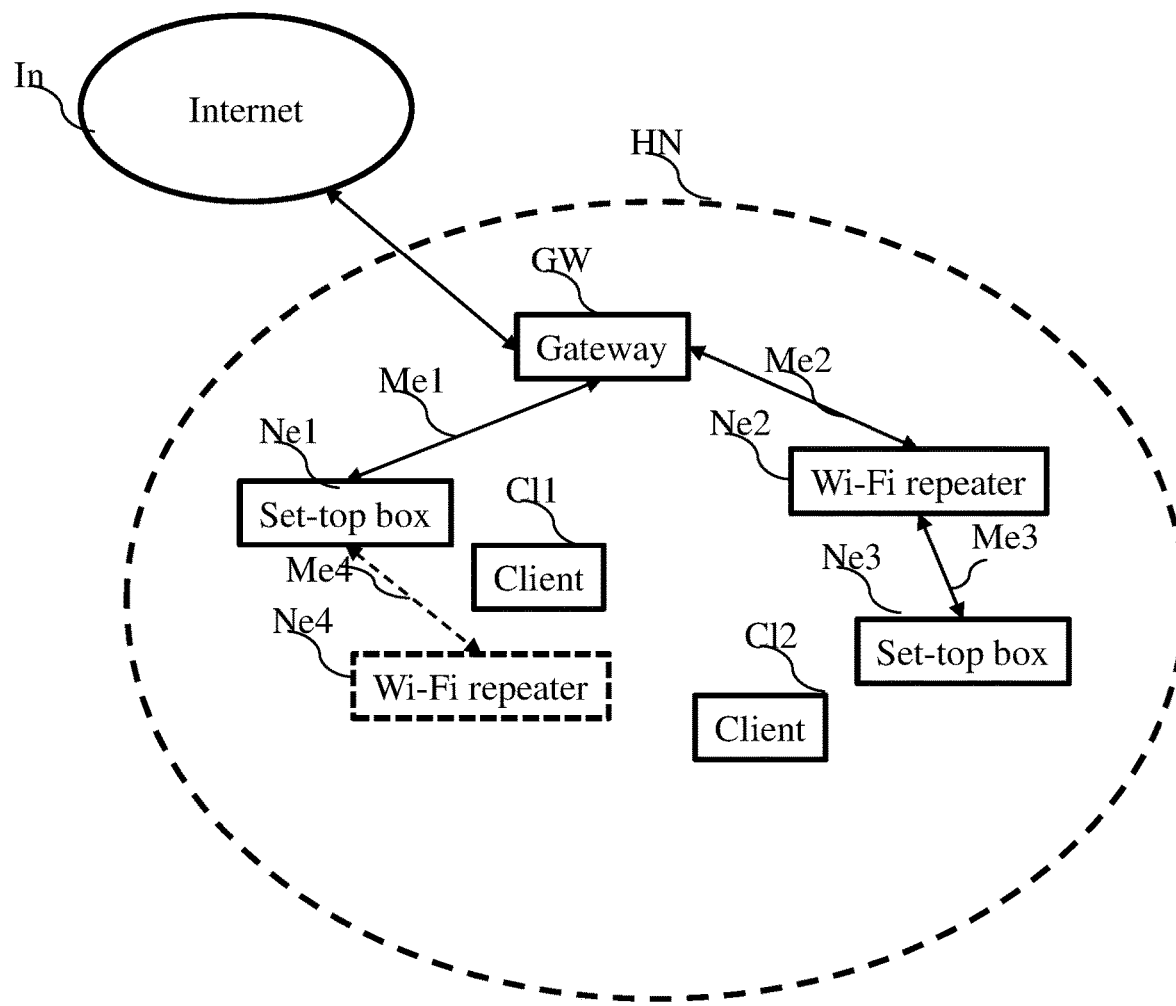
FIG. 1 depicts a telecommunication network in which the present invention is implemented.

FIG. 1 depicts a telecommunication network in which the present invention is implemented.

The telecommunication network of FIG. 1 is a home network HN that comprises a residential gateway GW connected to a network of the internet type In. The residential gateway GW serves as an access point to the internet network In and to the devices of the home network HN by means of a wireless network of the Wi-Fi type. For example, a TV set-top box Ne1, a Wi-Fi repeater Ne2, a TV set-top box Ne3, and two client devices Cl1 and Cl2 are included in the home network HN.

The client devices Cl1 and Cl2 are for example computers, touch tablets or smartphones.

The TV set-top boxes Ne1, Ne3 and the Wi-Fi repeater Ne2 are nodes of a mesh network represented by the arrows denoted Me1, Me2, Me3 in FIG. 1.

According to the present invention, a new node Ne4 is installed in the home network HN supplying a client network. The node Ne4 is for example a Wi-Fi repeater or extender.

The node Ne4, if the installation succeeds, will be connected to the mesh network by the connection represented by the arrow denoted Me4.

The mesh network comprises the communication links between the various nodes of the Wi-Fi network. The client network comprises the connections of the client devices in the home network. The client network is supplied by the gateway or by each node of the mesh network and enables the client devices (smartphone, tablet, computer, etc.) to access among other things an external network by means of the residential gateway.

It should be noted that, in the case of a mesh network of the Ad-Hoc type, all the nodes visible to each other can exchange messages without having made a connection; whereas in the case of a mesh network of the infrastructure type only the nodes connected together between a client and an access point can exchange messages.

According to the present invention, a node of the mesh network taking over the installation:

detects a new connection coming from a new node to the client network supplied by the node taking over the installation, receives an identifier of a client device wishing to adopt a role of trusted third party, the client device being connected to the client network supplied by the new node, itself connected to the client network of the node taking over the installation, checks whether the client device is a regular user of the home network in order to endorse the role of trusted third party and, if so:

notifies the new node that the client device that is connected to the client network supplied by the new node must be disconnected from the client network supplied by the new node, detects a connection of the client device to the client network supplied by another node of the mesh network or to the client network supplied by the node taking over the installation, transfers to the new node identifiers of the mesh network in accordance with a security protocol of the transport layer if the connection of the client device to the client network supplied by another node of the mesh network or to the client network supplied by the node taking over the installation is detected.

According to the present invention, the new node to be installed:

connects to the client network supplied by the home network;

connects, in accordance with a security protocol of the transport layer, to the mesh node taking over the installation, detects a new connection coming from the client device wishing to adopt the role of trusted third party to the client network supplied by the new node, recovers an identifier of the client device wishing to adopt the role of trusted third party and transfers the identifier to the node taking over the installation, receives a notification requesting to disconnect the client device endorsing the role of trusted third party from the client network supplied by the new node, disconnects the client device from the client network supplied by the new node, receives the node taking over the installation of the identifiers enabling the new node to connect to the mesh network, configuration of the identifiers making it possible to finalise the installation of the new node.

Figure 2:
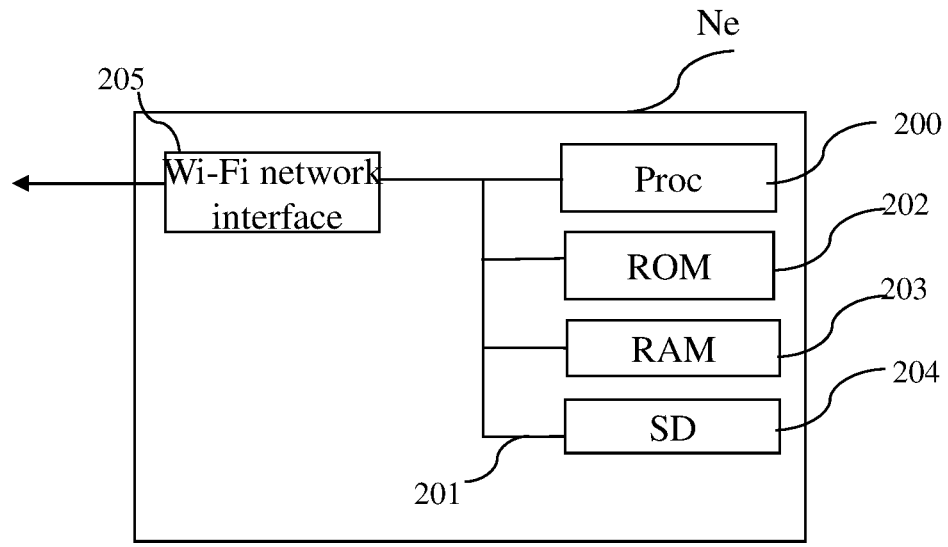
FIG. 2 depicts an example of architecture of a node in which the present invention is implemented.

FIG. 2 depicts an example of architecture of a node in which the present invention is implemented.

The node Ne comprises:

a processor, microprocessor or microcontroller 200;

a volatile memory 203;

a non-volatile memory 202;

optionally, a storage medium reader 204, such as an SD card (Secure Digital card) reader or a hard disk;

one or more Wi-Fi radio modules each comprising one or more Wi-Fi network interfaces 205;

a communication bus 201 connecting the processor 200 to the ROM memory 202, to the RAM memory 203, to the storage medium reader 204 and to the network interface 205.

The processor 200 is capable of executing instructions loaded in the volatile memory 203 from the non-volatile memory 202, from an external memory (not shown), from a storage medium, such as an SD card or the like, or from a communication network. When the node Ne is powered up, the processor 200 is capable of reading instructions from the volatile memory 203 and executing them. These instructions form a computer program that causes the implementation, by the processor 200, of all or part of the method described in relation to FIGS. 4 and 5.

All or part of the method described in relation to FIGS. 4 and 5 can be implemented in software form by the execution of a set of instructions by a programmable machine, such as a DSP (digital signal processor) or a microcontroller or be implemented in hardware form by a machine or a dedicated component, such as an FPGA (field-programmable gate array) or an ASIC (application-specific integrated circuit).

Figure 3:
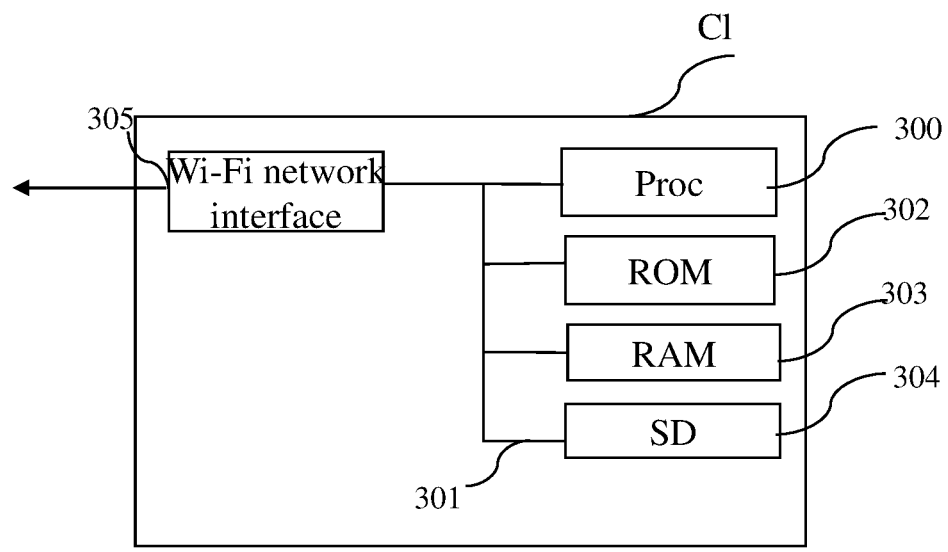
FIG. 3 depicts an example of architecture of a client device in which the present invention is implemented.

FIG. 3 depicts an example of architecture of a client device in which the present invention is implemented.

The client device Cl comprises:
- a processor, microprocessor or microcontroller 300;
- a volatile memory 303;
- a non-volatile memory 302;
- optionally, a storage medium reader 304, such as an SD card (Secure Digital card) reader or a hard disk;
- one or more Wi-Fi radio modules each comprising one or more Wi-Fi network interfaces 305;
- a communication bus 301 connecting the processor 300 to the ROM memory 302, to the RAM memory 303, to the storage medium reader 304 and to the network interface 305.

The processor 300 is capable of executing instructions loaded in the volatile memory 303 from the non-volatile memory 302, from an external memory (not shown), from a storage medium, such as an SD card or the like, or from a communication network. When the client device Cl is powered up, the processor 300 is capable of reading instructions from the volatile memory 303 and executing them. These instructions form a computer program that causes the implementation, by the processor 300, of all or part of the method described in relation to FIG. 6.

Figure 6:
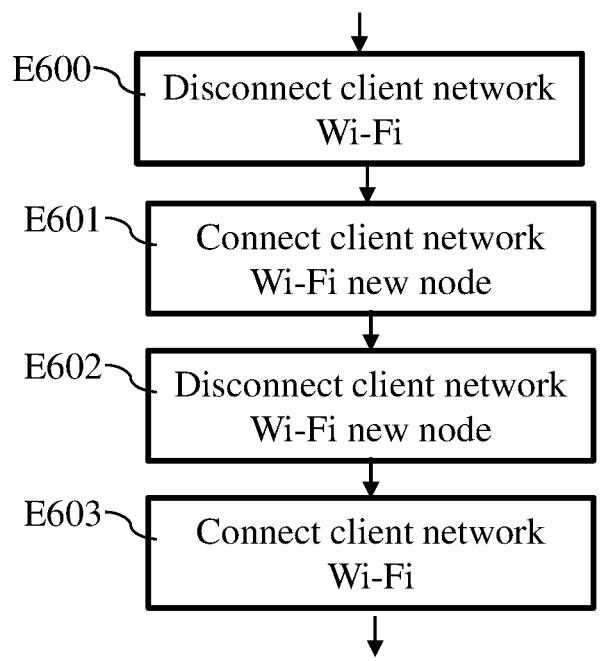
FIG. 6 depicts an example of an algorithm executed by a client device when a new node is installed in the mesh network according to the present invention.

All or part of the method described in relation to FIG. 6 can be implemented in software form by the execution of a set of instructions by a programmable machine, such as a DSP (digital signal processor) or a microcontroller or be implemented in hardware form by a machine or a dedicated component, such as an FPGA (field-programmable gate array) or an ASIC (application-specific integrated circuit).

FIG. 4 depicts an example of an algorithm executed by a new node when the latter is installed in a mesh network according to the present invention.

The present algorithm is described in an example in which it is executed by the processor 200 of the node Ne4.

Figure 4A:
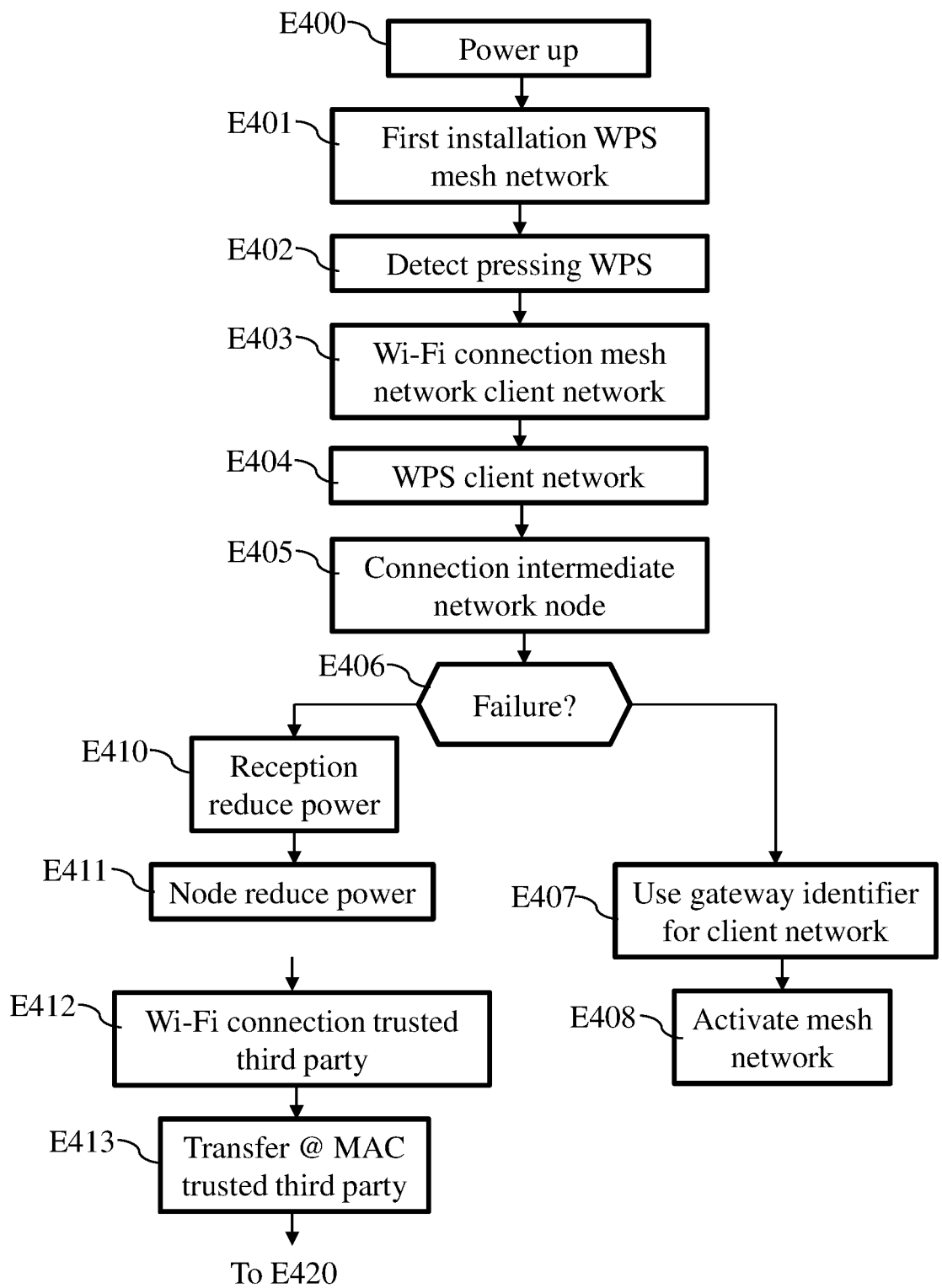
FIG. 4a depicts an example of an algorithm executed by a new node when the latter is installed in a mesh network according to the present invention.

At the step E400 in FIG. 4a, the node Ne4 is powered up. For example, the node Ne4 is powered up by the user of the client device Cl1. The node Ne4 is thus a new node of the mesh network.

At the step E401, the new node Ne4 loads and executes software for first installation of the new node, which associates a WPS (the acronym of Wi-Fi Protected Setup) pushbutton in a configuration of management of the mesh network.

At the following step E402, the new node Ne4 detects pressing on the WPS pushbutton of the node Ne4. The purpose of the WPS protocol is to simplify the phase of configuration of the security of the wireless networks. It enables private individuals having little knowledge of security to configure a WPA access, supported by the Wi-Fi appliances. In parallel, the user of the client device Cl1 has pressed on the WPS pushbutton of the home gateway GW or on a node of the mesh network if such exists.

In a variant, the new node Ne4 detects the entry of an identifier corresponding to the one presented on a label of the node Ne4.

At the step E403, the Wi-Fi interface that is intended to provide the connection with the mesh network is connected to the client network of the home gateway GW or of a node of the mesh network. The connection identifiers on the client network supplied by the home network are received and stored at this same step.

At the following step E404, the new node Ne4 associates a client network configuration with the WPS pushbutton of the node Ne4.

At the following step E405, the new node Ne4 attempts to establish a connection in accordance with a Transport Layer Security protocol, with the residential gateway or the node with which the Wi-Fi connection is established.

The TLS protocol functions in accordance with a client-server mode. It makes it possible to satisfy the objectives of authentication, confidentiality of the data exchanged (or encrypted session), and the integrity of the data exchanged.

At the following step, the new node Ne4 checks whether or not the connection according to the security protocol of the transport layer has failed.

If the connection has failed, that is to say if no response to the attempt at connection has been received, the new node Ne4 is the first node of the mesh network. The new node Ne4 passes to the step E407.

If the connection has succeeded, the new node Ne4 passes to the step E410.

At the step E407, the new node Ne4 recovers the connection identifiers of the client network supplied by the home network stored at the step E403, such as the SSID (the acronym for service set identifier), and received from the home gateway or from a node of the mesh network as identifiers that have to be used by the client devices to connect to the client network supplied by the new node Ne4 installed.

At the step E408, the new node Ne4 activates the mesh network functionality of the node Ne4.

At the step E410, the new node Ne4 detects the reception of a message indicating that it must lower the transmission power of its Wi-Fi interface.

At the step E411, the new node Ne4 commands the Wi-Fi interface 205 so that the transmission power is reduced.

At the following step E412, the new node Ne4 detects the connection of a client device CL1 by means of its Wi-Fi interface 205. The connection of the client device is for example made by detecting the entering of the SSID identifier of the node Ne4 printed on a label placed on the new node Ne4 or by a connection by means of WPS pushbuttons.

At the following step E413, the new node Ne4 demands the transfer of the MAC address used as the identifier of the client device Cl1 to the node to which it is connected, for example the node Ne1, using the secure protocol of the transport layer in order to allow validation of a role of trusted third party endorsed by said client device Cl1.

Figure 4B:
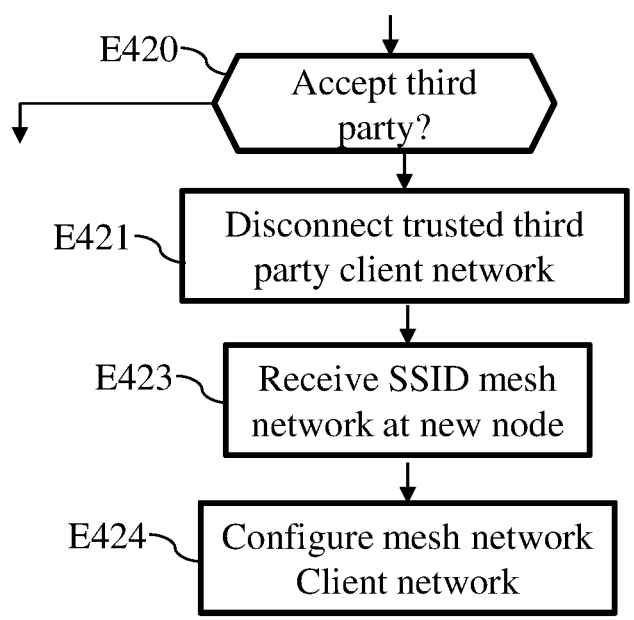
FIG. 4b depicts an example of an algorithm executed by a new node when the latter is installed in a mesh network according to the present invention.

At the following step E420 in FIG. 4b, the node Ne1 checks whether a message accepting the role of trusted third party endorsed by said client device Cl1 is received from the node Ne1.

If not, the new node Ne4 interrupts the present algorithm. If so, the new node Ne4 passes to the step E421.

At the step E421, the new node Ne4 disconnects the client device Cl1 from its Wi-Fi interface 205. For this purpose, the new node Ne4 deactivates its client network or optionally puts the MAC address of the client device in a blacklist. At this same step, the new node Ne4 demands the transfer of a message intended for the node Ne1, informing the latter of the disconnection of the client device Cl1.

At the step E423, the new node Ne4 detects the reception of the identifiers of the node Ne1 enabling the new node to join the mesh network, configures its mesh network and its client network from these identifiers, finalises the insertion of the node in the mesh network and goes into a nominal state at the step E424.

FIG. 5 depict an example of an algorithm executed by a mesh node when the node is a node managing the installation of a new node of the mesh network according to the present invention.

The present algorithm is described in an example in which it is executed by the processor 200 of the node Ne1.

Figure 5A:
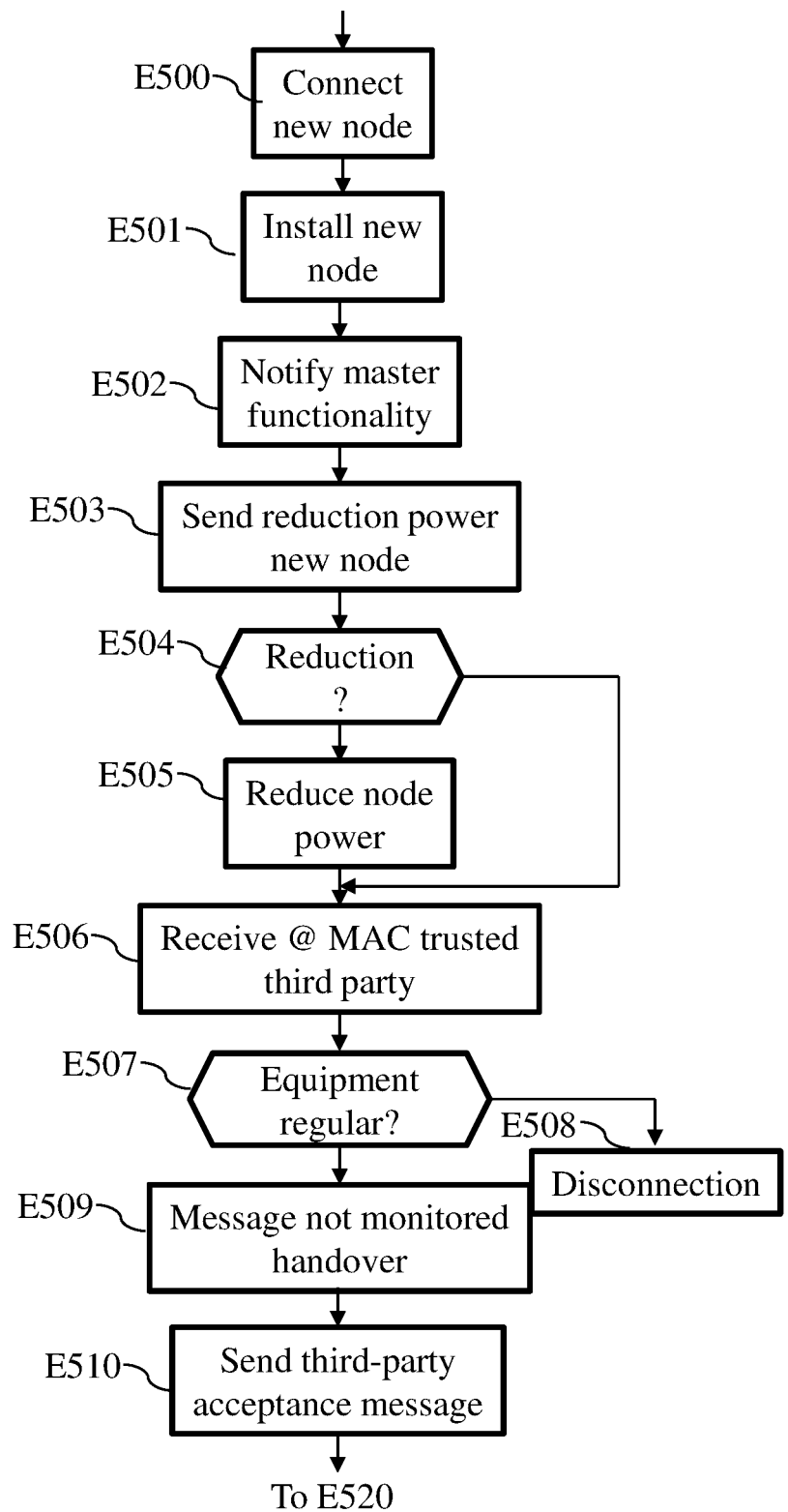
FIG. 5a depicts an example of an algorithm executed by a mesh node when the node is a node managing the installation of a new node of the mesh network according to the present invention.

At the step E500 of the algorithm in FIG. 5a, the processor 200 detects a pressing on the WPS pushbutton of the node Ne1. In parallel, the user of the client device Cl1 has pressed on the WPS pushbutton of a new node, for example the node Ne4. The new node Ne4 is thus connected to the client network supplied by the node Ne1.

At the following step E501, the node Ne1 detects, by means of the Wi-Fi connection, an attempt at connection in accordance with the security protocol of the transport layer.

At the following step E502, the node Ne1 commands the interface 205 in order to notify to each other node of the mesh network that it is taking over the installation of a new node.

At the following step E503, the node Ne1 demands the sending of a message indicating to the new node Ne4 that the latter must lower the transmission power of its Wi-Fi interface.

At the following step E504, the node Ne1 checks whether the new node Ne4 has lowered the transmission power of its Wi-Fi interface. If so, the node Ne1 passes to the step E506. In the negative, the node Ne1 passes to the step E505.

At the step E505, the node Ne1 commands the Wi-Fi interface 205 so that the transmission power is reduced and next passes to the step E506.

At the step E506, the node Ne1 detects the reception of the MAC address of the client device Cl1 by the new node Ne4.

At the step E507, the node Ne1 checks whether the MAC address received corresponds to that of a regular client device of the home network in order to validate a role of trusted third party. Each node stores the MAC address of the client devices to which it was connected. A regular client device is a client device that periodically accesses the home network. A regular client device is for example a client device that accesses the home network at least ten times a month. For this purpose, the node Ne1 interrogates a database of a discovery function ("device discovery") monitoring the client devices and interrogates the other databases of the other nodes of the mesh network.

If the MAC address received corresponds to that of a regular client device, the node Ne1 passes to the step E509. If not, the node Ne1 passes to the step E508 and interrupts the installation of the new node Ne4 at the step E508.

At the step E509, the node Ne1 demands the transfer of a message to all the other nodes, with the exception of the node Ne4, indicating that the client device Cl1 the MAC address of which was previously communicated to them must no longer be taken over by them in any intercell handover. This same message indicates that the other nodes must inform it of any presence of this MAC address on the home network.

At the following step E510, the node Ne1 demands the transfer of a message to the new node Ne4 informing the latter of the acceptance of the role of trusted third party endorsed by the client device Cl1.

Figure 5B:
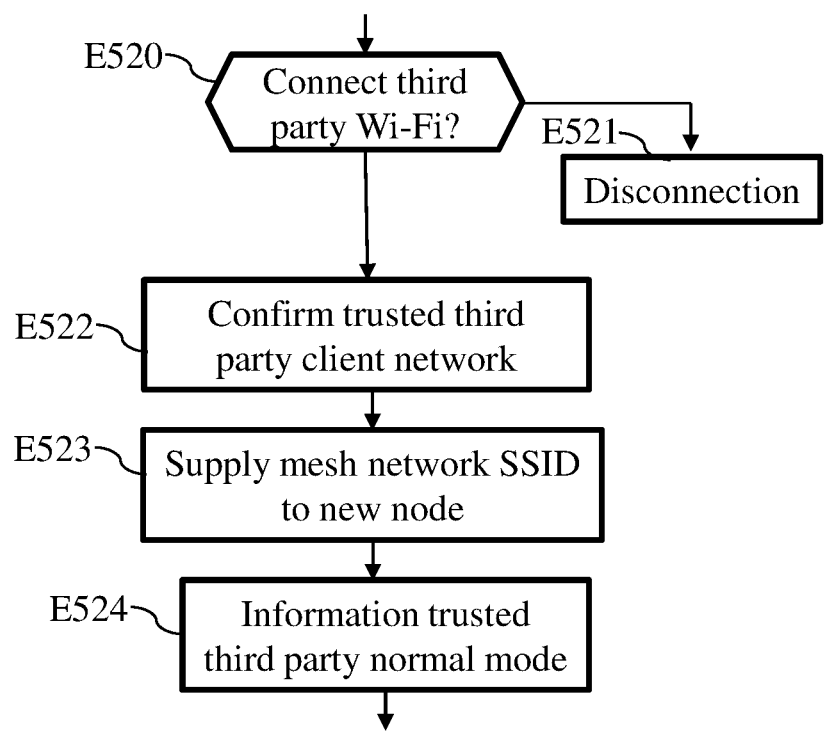
FIG. 5b depicts an example of an algorithm executed by a mesh node when the node is a node managing the installation of a new node of the mesh network according to the present invention.

At the step E520 in FIG. 5b, the node Ne1 checks whether the client device Cl1 connects to the client network supplied by the home network. If so, the node Ne1 passes to the step E522. If not, the node Ne1 passes to the step E521 and interrupts the installation of the new node Ne4 at the step E521.

At the step E522, the node Ne1 determines that the client device is a trusted third party. At the following step E523, the node Ne1 demands the sending of the identifiers of the mesh network to the node Ne4 in accordance with the TLS protocol.

At the following step E524, the node Ne1 notifies the other nodes of the mesh network that the client device Cl1 must be considered to be a conventional client device, that it must not be put in a blacklist and that the handover of the client devices Cl1 can be performed.

It should be noted that, in a particular embodiment, the node Ne1 may execute E506 to E509 at least twice.

FIG. 6 depicts an example of an algorithm executed by a client device during the installation of a new node in the mesh network according to the present invention.

At the step E600, the client device Cl1 receives a disconnection from the client device supplied by the residential gateway or a node of the home network.

At the step E601, the client device Cl1 reconnects to the client device supplied by the new node Ne4 by means of its saved Wi-Fi profile corresponding to the new node Ne4.

At the step E602, the client device Cl1 detects that the client device Cl1 is disconnected from the client network supplied by the new node Ne4.

At the step E603, the client device Cl1 reconnects to the client network supplied by the node Ne1 of the home network.

The invention claimed is:

1. A method for installing a new node in a wireless home network, the home network consisting of a client network by means of which client devices access an external network by means of a residential gateway, the home network comprising a node able to form a mesh network within the home network in order to extend the range of the home network, wherein the method causes the node of the home network to perform:
    detecting a connection of a new node to a client server supplied by the node of the home network,
    receiving an identifier of a client device that is connected to the client network supplied by the new node,
    checking whether the client device is a client device known to the home network and, if so:
    notifying the new node that the client device that is connected to the client network supplied by the new node must be disconnected from the client network,
    detecting a connection of the client device to the client network supplied by the node of the home network,
    transferring to the new node identifiers of the mesh network according to a security protocol of the transport layer if the connection of the disconnected client device to the client network supplied by the node of the home network is detected.

2. The method according to claim 1, wherein the transfer to the new node of the identifiers of the mesh network according to a security protocol of the transport layer is performed if the client device is disconnected at least twice from the client network supplied by the new node and if the client device connects to the client network supplied by the node of the home network at each disconnection of the client device supplied by the new node.

3. The method according to claim 1, wherein the method further causes the node of the home network to perform transferring a command to reduce the transmission power of the signals transmitted by the new node.

4. The method according to claim 3, wherein the method causes the node of the home network to perform reducing the transmission power of the signals transmitted by the node of the home network if no drop in the transmission power of the signals transmitted by the new node is detected.

5. The method according to claim 1, wherein the method causes the node of the home network to perform, prior to the notification to the new node that the client device that is connected to the client network supplied by the new node must be disconnected from the client network, transferring a message to other nodes in the network notifying the other nodes that the client device must not be taken over by the other nodes.

6. The method according to claim 5, wherein the method further causes the node of the home network to perform, subsequently to the transfer to the new node of the identifiers of the network, transferring a message to other nodes in the network notifying the other nodes that the client device can be taken over by the other nodes.

7. The method according to claim 5, wherein the taking over or non-taking over of the client device is performed using a blacklist or a whitelist of identifiers of client devices.

8. The method according to claim 5, wherein the method wherein the method further causes the node of the home network to perform notifying the other nodes of the taking over by the node of the network of the installation of the new node.

9. A non-transitory storage medium that stores a computer program comprising instructions for implementing, by a device, the method according to claim 1, when said program is executed by a processor of said device.

10. A method for installing a new node in a wireless home network, the home network consisting of a client network by means of which client devices access an external network by means of a residential gateway, the home network comprising a node able to form a mesh network within the home network in order to extend the range of the home network, wherein the method causes the new node perform:
 connecting the new node to be installed to the client network supplied by the home network,
 connecting, according to a security protocol, the transport layer to the node able to form a mesh network,
 detecting a new connection coming from a client device to the client network supplied by the new node,
 recovering an identifier of the client device and transferring the identifier to the node able to form the mesh network,
 receiving a notification requesting disconnection of the client device from the client network supplied by the new node,
 disconnecting the client device from the client network supplied by the new node,
 receiving, from the node able to form a mesh network, identifiers enabling the new node to connect to the mesh network,
 configuring the identifiers making it possible to finalise the method for installation of the new node.

11. A device for installing a new node in a wireless home network, the home network consisting of a client network by means of which the client devices access an external network by means of a residential gateway, the home network comprising a node able to form a mesh network within the home network in order to extend the range of the home network and supplying the client network, wherein the device is included in a node of the home network and comprises circuitry causing the node of the home network to perform:
 detecting a new connection of a new node to a client server supplied by the node of the home network,
 receiving an identifier of a client device that is connected to the client network supplied by the new node,
 checking whether the client device is a client device known to the home network and, if so:
 notifying the new node that the client device that is connected to the client network supplied by the new node must be disconnected from the client network,
 detecting a connection of the client device to the client network supplied by the node of the home network,
 transferring to the new node identifiers of the mesh network according to a security protocol of the transport layer if the connection of the disconnected client device to the client network supplied by the node of the home network is detected.

12. A device for installing a new node in a wireless home network, the home network consisting of a client network by means of which the client devices access an external network by means of a residential gateway, the home network comprising a node able to form a mesh network within the home network in order to extend the range of the home network, wherein the installation device is comprised in a new node and comprises circuitry causing the new node to perform:
 connecting the new node to be installed to the client network supplied by the home network,
 connecting, according to a security protocol, the transport layer to the node able to form a mesh network,
 detecting a new connection coming from a client device to the client network supplied by the new node,
 recovering an identifier of the client device and transferring the identifier to the node able to form the mesh network,
 receiving a notification requesting disconnection of the client device from the client network supplied by the new node,
 disconnecting the client device from the client network supplied by the new node,
 receiving, from the node able to form a mesh network, identifiers enabling the new node to connect to the mesh network,
 configuring the identifiers making it possible to finalise the method for installation of the new node.

* * * * *